R. P. HARPER.
VEHICLE SEAT.
APPLICATION FILED AUG. 14, 1915.
1,175,755.
Patented Mar. 14, 1916.
2 SHEETS—SHEET 1.
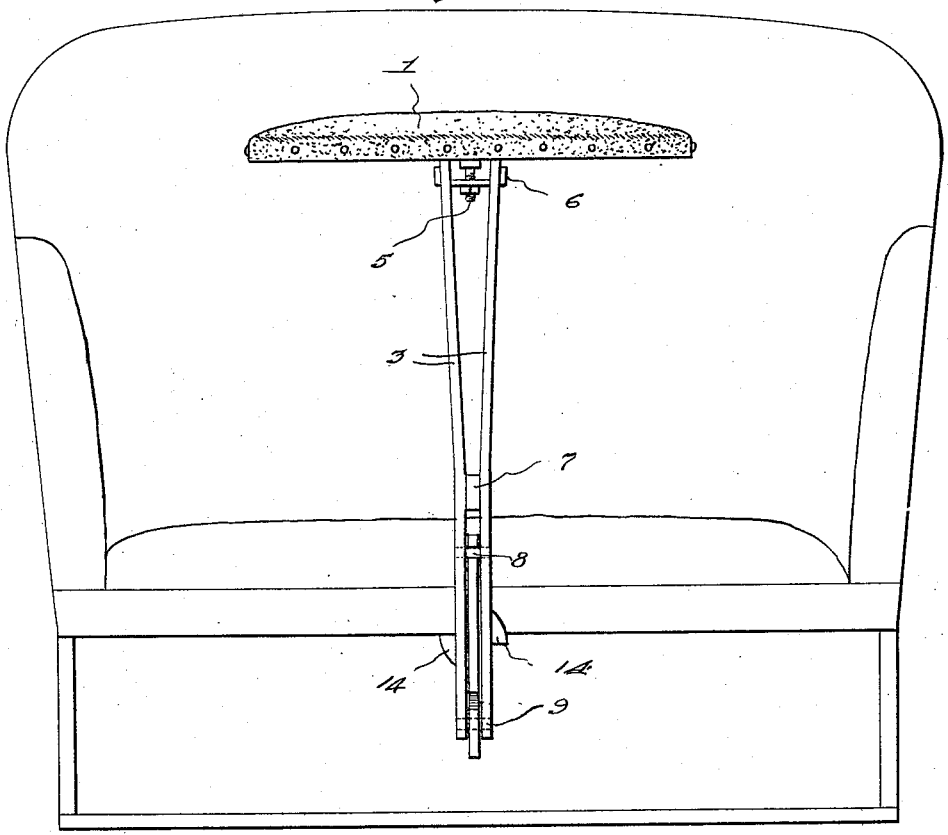
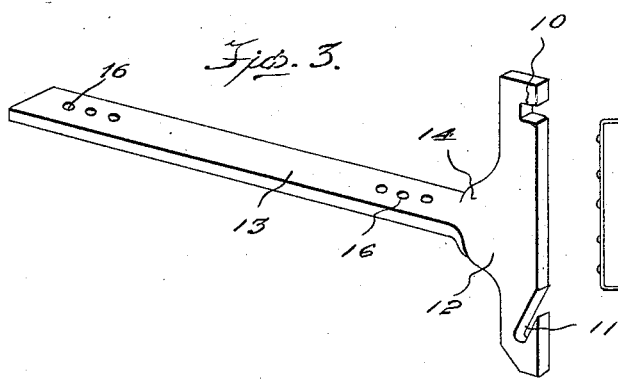
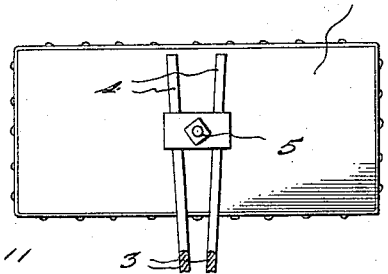
Inventor
R. P. Harper

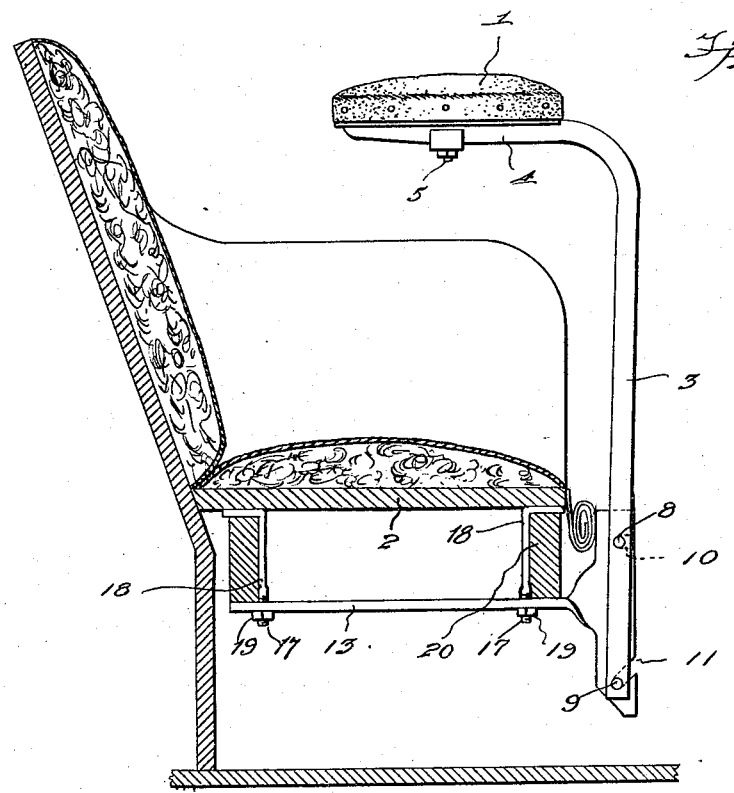
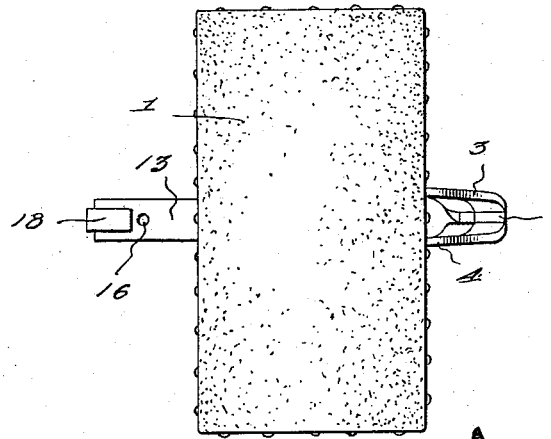

UNITED STATES PATENT OFFICE.

RAYMOND P. HARPER, OF LEONA, KANSAS.

VEHICLE-SEAT.

1,175,755.

Specification of Letters Patent. Patented Mar. 14, 1916.

Application filed August 14, 1915. Serial No. 45,592.

*To all whom it may concern:*

Be it known that I, RAYMOND P. HARPER, a citizen of the United States, residing at Leona, in the county of Doniphan and State of Kansas, have invented certain new and useful Improvements in Vehicle-Seats; and I do hereby declare the following to be a full, clear, and exact description of the invention, such as will enable others skilled in the art to which it appertains to make and use the same.

The invention relates to improvements in auxiliary or supplemental seats for carriages, automobiles and other vehicles.

The object of the present invention is to improve the construction of supplemental or auxiliary seats for carriages, automobiles and other conveyances and to provide a simple, practical and inexpensive seat designed for the use of third persons in a two seated vehicle and adapted to be readily applied to a carriage or automobile seat and capable of being arranged out of the way while the occupants of the main seat are entering the vehicle and of being readily placed in position for use to accommodate an additional person.

A further object of the invention is to provide a vehicle seat of this character which, when not in use may be arranged out of the way and out of sight so that it will not in any manner spoil the appearance of a carriage or interfere with the occupants thereof when the same is used by only two persons.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a front elevation of an auxiliary vehicle seat constructed in accordance with this invention and shown applied to the seat of the vehicle, Fig. 2 is a side elevation of the same, the seat of the vehicle being in section, Fig. 3 is a detail perspective view of the supporting bar or member, Fig. 4 is a plan view of the auxiliary seat, Fig. 5 is a reverse plan view partly in section.

Like numerals of reference designate corresponding parts in the several figures of the drawings.

In the accompanying drawings in which is illustrated the preferred embodiment of the invention, 1 designates a supplemental or auxiliary seat suitably upholstered and designed to be arranged above the seat 2 of the vehicle as shown to accommodate a third person. The supplemental seat proper may be of any desired construction and made either plain or upholstered to adapt it for the character of vehicle on which it is to be used.

The supplemental or auxiliary seat is supported in an elevated position above the seat 2 by means of a standard 3 of substantially L-shape composed of spaced sides and having a short rearwardly extending horizontal arm 4 at the top to receive the seat 1 which is provided with a central depending bolt 5. The bolt passes centrally through a clip or clamping plate 6 of approximately U-shape adapted to straddle the horizontal arm 4 and engage the sides thereof, whereby the seat is adjustably secured to the arm of the L-shaped standard.

The sides of the L-shaped standard are spaced apart by a block or piece 7 and they diverge upwardly therefrom slightly and they are provided below the said block or piece with spaced transverse fastening devices 8 and 9 adapted to engage upper and lower slots 10 and 11 of a head 12 of a supporting bar or member 13. The supporting bar or member 13 may consist of heavy plate metal having a quarter bend 14 adjacent to the head to arrange the latter in an upright position while the side faces of the bar or member 13 are in a horizontal position. The supporting bar or member 13 is provided at its front and rear portions with perforations 16 adapted to receive stems 17 of approximately L-shaped clamps 18. The stems 17 are threaded for the reception of nuts 19 and the clamps are adapted to engage with suitable portions of a vehicle seat. In Fig. 2 of the drawing the clamps are engaged with bars or cleats 20 but they may be applied to any convenient portion of a carriage or automobile seat whereby the supporting bar or member is detachably clamped to the same. Also the supporting bar or member may be secured to a seat in any other desired manner.

The head 12 which is preferably arranged so as to be covered by the curtain of the seat when the said curtain is down has its lower slot 11 aranged in an inclined position to form an open socket for the lower fastening device 9 of the standard and the upper slot 10 is substantially horizontal and of sufficient size to enable the upper fastening device 8 to swing into and out of the said upper slot for arranging the supplemental or auxiliary seat upon the bottom of the body of the vehicle while the occupants of the main seat 2 are entering or leaving the vehicle. The bottom of the upper slot is designed to be arcuate but the curvature will be extremely slight. As the center of gravity of the supplemental or auxiliary seat is in rear of the vertical plane of the head, the weight of a person will operate to maintain the upper fastening device firmly in the upper slot. When the supplemental or auxiliary seat is not in use the standard may be disconnected from the head to enable the auxiliary seat to be placed under the main seat out of the way.

What is claimed is:

1. A supplemental vehicle seat including a supporting member having a forwardly projecting portion provided with spaced upper and lower slots extending inwardly or rearwardly, one of the slots being arranged at an inclination and extending downwardly to form a socket and a seat supporting standard having spaced means for detachably engaging the slots.

2. A supplemental vehicle seat including a supporting member having means for securing it to the main seat of a vehicle and provided with a head having spaced slots, and a standard composed of spaced sides and having connecting means detachably engaging the said slots, the sides receiving the said head between them, and a seat supported by the standard.

3. A device of the class described including a supporting bar or member provided with means for securing it to the main seat of a vehicle and having a head provided with a lower inclined slot and having an upper approximately horizontal slot and a seat having a standard provided with spaced means for engaging the said slots, the lower slot forming a socket.

In testimony whereof I affix my signature in presence of two witnesses.

RAYMOND P. HARPER.

Witnesses:
A. O. DELANEY,
O. L. DENNIS.

Copies of this patent may be obtained for five cents each, by addressing the "Commissioner of Patents, Washington, D. C."